No. 719,327. PATENTED JAN. 27, 1903.
R. B. HAIN.
TRANSMISSION GEAR MECHANISM.
APPLICATION FILED JULY 30, 1902.
NO MODEL. 2 SHEETS—SHEET 2.
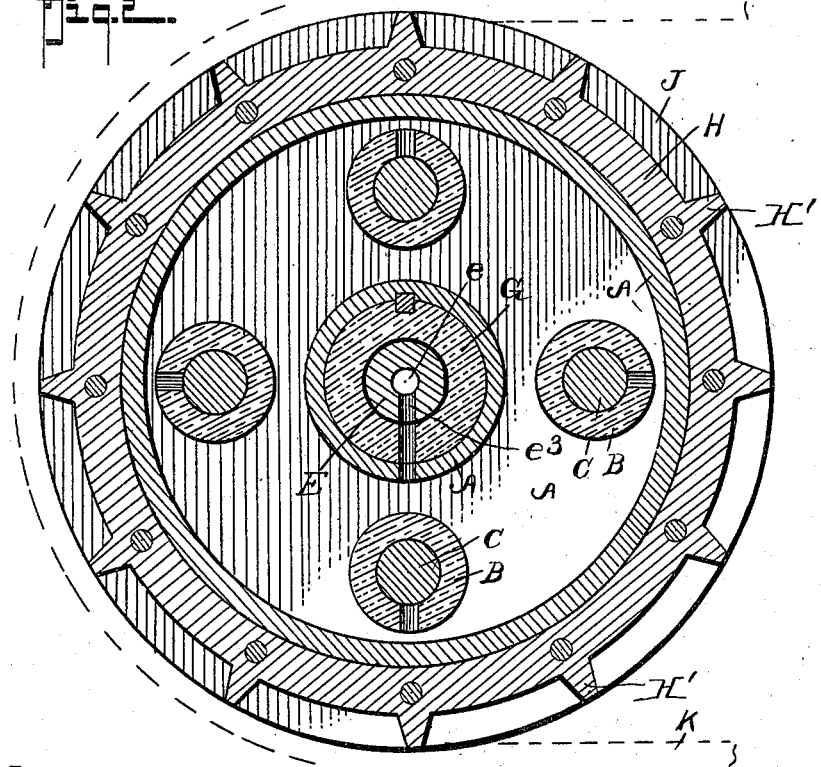
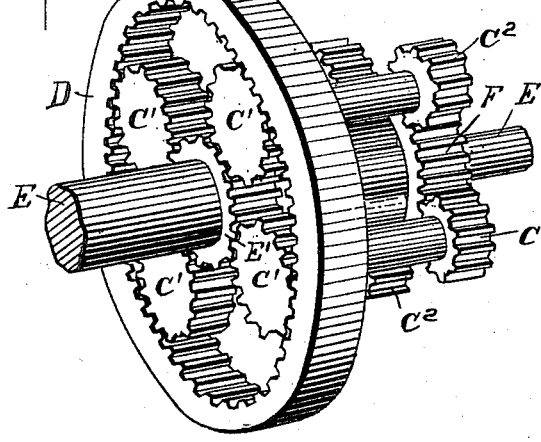
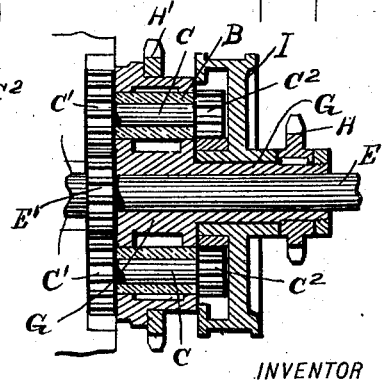
WITNESSES:
Jos. A. Ryan
Fred P. Bradford
INVENTOR
R. B. Hain.
BY Munn & Co.
ATTORNEYS.

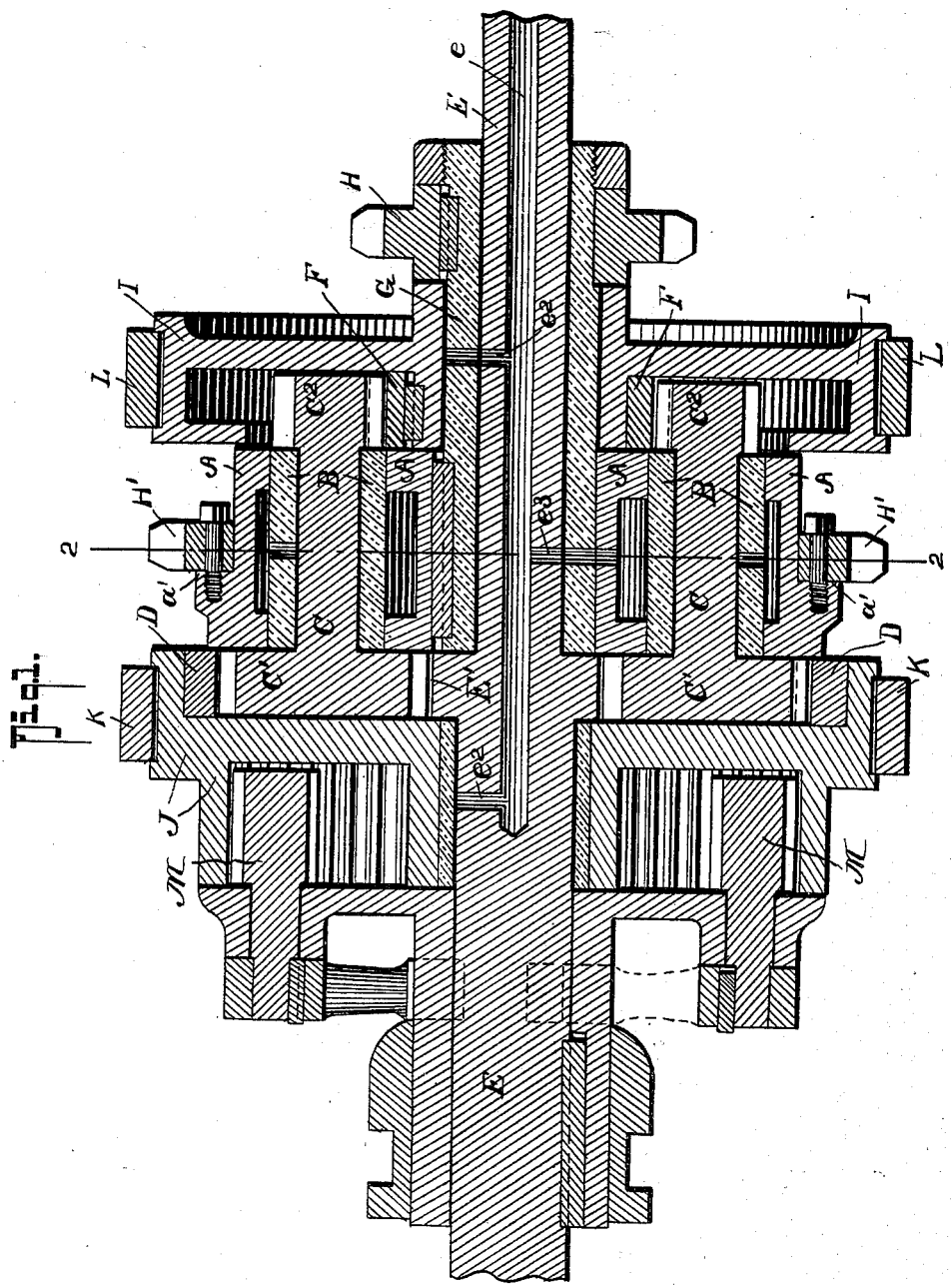

UNITED STATES PATENT OFFICE.

RALPH BENTON HAIN, OF LOS ANGELES, CALIFORNIA, ASSIGNOR TO AUTO VEHICLE COMPANY, OF LOS ANGELES, CALIFORNIA, A CORPORATION OF CALIFORNIA.

TRANSMISSION-GEAR MECHANISM.

SPECIFICATION forming part of Letters Patent No. 719,327, dated January 27, 1903.

Application filed July 30, 1902. Serial No. 117,651. (No model.)

*To all whom it may concern:*

Be it known that I, RALPH BENTON HAIN, residing at Los Angeles, in the county of Los Angeles and State of California, have invented certain new and useful Improvements in Transmission-Gear Mechanisms, of which the following is a specification.

My invention, which relates generally to improvements in transmission-gearing, more specifically seeks to provide an improved type of sun-and-planet gear mechanism of a simple and staple construction in which the several parts are coöperatively arranged, whereby the power can be conveniently, quickly, and positively shifted for producing variable-speed motion without jarring or undue strain on the operating parts.

My invention comprehends a novel arrangement of a pair of brake-controlled drums mounted on a single shaft, direct gear connections joining one of the said drums with the shaft and indirect gear connections joining the other drum with the shaft, a drive-sprocket equipped drum carrying differential diameter-gears coacting with the two drums, adapted under one adjustment of the entire mechanism to effect a direct connection between one drum and the shaft and under another adjustment an indirect connection with the other drum and shaft and a drive-sprocket connected with the gear-carrying arm.

In its more subordinate nature my invention comprises certain details of construction and peculiar combination of parts, all of which will hereinafter be fully explained, and specifically pointed out in the appended claims, reference being had to the accompanying drawings, in which—

Figure 1 is a vertical longitudinal section of my improved transmission-gear mechanism. Fig. 2 is a transverse section thereof on the line 2 2 of Fig. 1. Fig. 3 is a diagrammatic perspective view illustrating the position of the several gears that join the internally-geared drum and the axially-equipped gear-drum. Fig. 4 is a section of a slightly-modified form of my invention.

In its practical construction my invention comprises a main shaft E, provided with an integral or fixedly-connected pinion E'. Adjacent the pinion E', loosely mounted on the shaft E, is a brake-drum J, provided with an internal or orbit gear D, with which meshes the large pinion C' on the short shaft C and which also meshes with the pinion E', as clearly shown in Fig. 1, by reference to which it will be observed at a suitable distance in advance of the gear D is disposed a second brake-drum I, which is loosely journaled on the long hub G, keyed to another drum A, located between the drums J and I and in which the shafts C are journaled and are held to loosely rotate in the bushings or bearing-sleeves B B, detachably mounted on the said drum A.

The hub G carries a sprocket H, from which power is transmitted to the drive-axle or vehicle-wheels, it being understood that a gear can be substituted for the sprocket for transmitting the power, if desired. The central drum A is formed with an annular flange $a'$, to which is fixedly connected a sprocket-wheel H', which is utilized for transmitting a high-speed motion to the driving-axle or the vehicle-wheel and also for centrally locating the high-speed drive-chain.

In the construction of mechanism described and shown the long hub G with the drum A, together with the brake-drum J, are mounted to freely rotate around the main shaft E, and the brake-drum I is freely rotatable around the sleeve or hub G.

K and L designate the brake-bands for coöperating with the drums J and I, respectively, and which may be arranged in any well-known or approved manner. In my complete mechanism I prefer to utilize the alternately-operatable brake-band devices disclosed in my Patent No. 715,060, dated December 2, 1902.

The shaft E is provided with a central oil-reservoir $e$, having laterals $e^2$ $e^3$, which lead to the several bearings, and one of said laterals $e^3$ communicates with the hollow of the drum A, which in practice can be utilized as an oil-reservoir and provided with a suitably-plugged feed-opening, (not shown,) it being understood that when the drum A is thus utilized the end of shaft E would be permanently plugged to prevent escape of the lubricant.

Instead of keying the hub G to the drum A, as shown in Fig. 1, it may be an integral part of the said hub, as shown in Fig. 4, and the bushings B are split, so they can be readily placed on the shaft C and the said shaft, with the bushings, fitted in the bored holes in the drum A. While four shafts C, with gears C' C², are shown in the drawings, it is manifest a less number of said shafts and gears may be used to effect a desired operation of the mechanism, (three being preferable.)

From the foregoing, taken in connection with the drawings, it is believed the complete arrangement, the simple manner in which the mechanism is capable of being shifted, and its advantages will readily appear to those skilled in the art to which it appertains.

Briefly stated, the operation is as follows: Assuming the brake K to be applied to the drum J to hold the same from rotation, the movement of the shaft E through the pinion E' rotates the pinions C' and carries them around the orbit-gear D, and thereby imparts motion to the drum A, it being understood that the shafts C at this time revolve in their bearings carried by the drum A, as it, together with the hub G, during the said adjustment of parts, will now travel in the same direction of rotation of the main shaft, but at a slower speed. When the brake K is released and the brake L applied, the drum I, with the main shaft E, running as before, the motion of the drum J is reversed, which now receives a direct power from pinion C', gear C, and the internal gear D. This action of the gear C causes the small gear C² to rotate around the gear F on the brake-drum I in an opposite direction to the main shaft E, and thereby produces a reverse motion of the drum A, the sleeve G, and the sprockets H' H at a speed slower than that of the main shaft E. When both brakes K and L are released from their respective drums, the main shaft E is free to rotate, while the gear C', with the drum A, its sleeve G, and the sprockets H H' are at a standstill, while the brake-drums J and I revolve in opposite directions to each other. Now when in this position by applying the friction-clutch devices (designated by M in Fig. 1) or any other suitable locking means for joining the shaft E and brake-drum J, the entire mechanism will be locked, and the drums J and I, pinions C C', drum A, with its hub G, together with the sprockets H H', will all revolve with and at the same speed of the the shaft E.

Slight changes in the details and modifications of the parts shown and described may be made without departing from my invention as defined by the appended claims.

Having thus described my invention, what I claim, and desire to secure by Letters Patent, is—

1. In a transmission-gear mechanism of the character described, the combination with the main drive-shaft, a pinion fixedly held thereon, a central drum loosely mounted on said drive-shaft, and having a laterally-extending hub, a pair of drums J and I disposed one at each side of the central drum, the drum J being loosely mounted on the drive-axle, the drum I being loosely mounted on the hub of the central drum A, a sprocket-pinion on said hub, a sprocket-rim on the body of the drum A, brake devices coöperating with the drums I and J, the central drum having a number of transverse journal-bearings, a shaft in each of said bearings, a large gear on one end of the shafts, a small gear on the other end, and held to mesh with the pinion on the drive-shaft, the drum J having an internal annular gear-rim, held to mesh with the large gear on the shaft mounted in the central drum, an axial gear on the drum held to mesh with the small gears on the central drum supported transverse shafts, all being arranged substantially as shown and described.

2. A transmission-gear of the character described, comprising the combination with the shaft E and the pinion E' fixedly held thereon; of a centrally-disposed drum, an annular sprocket-rim mounted on the said drum, a laterally-extending hub projected from the central drum, a sprocket-gear mounted on said hub, said hub being loosely mounted on the main shaft E, the drum J loosely mounted on the main shaft, a brake device coöperating therewith, said drum J being disposed at one side of the central drum and having an internal annular gear-rim, a series of gears C' carried by the central drum axially rotatable and revoluble around the main shaft, said gears meshing with the internal gear-rim on the drum J, a second series of small gears C² connected with and rotatable with the gears C', a third drum I loosely mounted on the hub of the central drum, an axial gear on the said third drum held to mesh with the gears C² and the clutch mechanism M, all being arranged substantially as shown and for the purposes described.

RALPH BENTON HAIN.

Witnesses:
CARROLL S. HARTMAN,
GRACE NICHOLSON.